(12) United States Patent
Bulin et al.

(10) Patent No.: US 9,175,695 B2
(45) Date of Patent: Nov. 3, 2015

(54) FLUID-COOLING DEVICE FOR A TURBINE ENGINE PROPULSIVE UNIT

(75) Inventors: Guillaume Bulin, Blagnac (FR); Ralf-Henning Stolte, Hamburg (DE)

(73) Assignees: AIRBUS OPERATIONS S.A.S., Toulouse (FR); AIRBUS OPERATIONS GmbH, Hamburg (DE)

( * ) Notice: Subject to any disclaimer, the term of this patent is extended or adjusted under 35 U.S.C. 154(b) by 918 days.

(21) Appl. No.: 13/322,512

(22) PCT Filed: May 21, 2010

(86) PCT No.: PCT/FR2010/050996
§ 371 (c)(1),
(2), (4) Date: Jun. 8, 2012

(87) PCT Pub. No.: WO2010/136710
PCT Pub. Date: Dec. 2, 2010

(65) Prior Publication Data
US 2012/0237332 A1      Sep. 20, 2012

(30) Foreign Application Priority Data

May 27, 2009   (FR) ...................................... 09 53483

(51) Int. Cl.
*F01D 25/12*      (2006.01)
*F04D 29/58*      (2006.01)
(Continued)

(52) U.S. Cl.
CPC .............. *F04D 29/584* (2013.01); *B64D 29/00* (2013.01); *B64D 33/10* (2013.01); *F02C 6/08* (2013.01); *F02C 7/14* (2013.01); *F02K 1/46* (2013.01);

(Continued)

(58) Field of Classification Search
USPC ......... 415/175, 176, 177, 178, 179; 60/226.1, 60/266, 267, 730
See application file for complete search history.

(56) References Cited

U.S. PATENT DOCUMENTS 4,601,202 A    7/1986   Colman et al.
4,999,994 A    3/1991   Rued et al.
(Continued)

FOREIGN PATENT DOCUMENTS

EP   1 018 468    7/2000
FR   2 902 831    12/2007
GB    750 200     6/1956

OTHER PUBLICATIONS

International Search Report Issued Mar. 1, 2011 in PCT/FR10/050996 Filed May 21, 2010.

*Primary Examiner* — Edward Look
*Assistant Examiner* — Justin Seabe
(74) *Attorney, Agent, or Firm* — Oblon, McClelland, Maier & Neustadt, L.L.P.

(57) ABSTRACT

A fluid cooling device for the propulsion unit of a propfan type aircraft including a compressed air intake at the air compressor of the turbomachine, an air vein capable of conveying the collected compressed air to a cooler, and a system for conveying the heat of the lubricant to the cooler is provided. The cooler includes a matrix body provided with a plurality of ducts for a cooling agent, the ducts extending along a first inner surface up to a second outer surface of the matrix body such that the collected pressurized air serving as a cooling agent can pass through the matrix body, the matrix body of the cooler forming a portion of the outer skin of the propulsion unit; and a set of fins extending from the outer surface towards the outside of the propulsion unit, and oriented mainly parallel to the air flow direction when the aircraft is in flight.

10 Claims, 6 Drawing Sheets

(51) Int. Cl.
*B64D 29/00* (2006.01)
*B64D 33/10* (2006.01)
*F02C 6/08* (2006.01)
*F02C 7/14* (2006.01)
*F02K 1/46* (2006.01)
*F02K 3/072* (2006.01)
*F28D 1/03* (2006.01)
*F28D 1/04* (2006.01)
*F28F 1/32* (2006.01)
*F28F 1/34* (2006.01)
*F28F 13/00* (2006.01)
*F28F 27/02* (2006.01)
*B64D 27/02* (2006.01)
*B64D 33/02* (2006.01)
*F28D 21/00* (2006.01)

(52) U.S. Cl.
CPC . *F02K 3/072* (2013.01); *F28D 1/03* (2013.01); *F28D 1/04* (2013.01); *F28F 1/32* (2013.01); *F28F 1/34* (2013.01); *F28F 13/00* (2013.01); *F28F 27/02* (2013.01); *B64D 2027/026* (2013.01); *B64D 2033/0286* (2013.01); *B64D 2241/00* (2013.01); *F05D 2220/325* (2013.01); *F28D 2021/0078* (2013.01); *Y02T 50/67* (2013.01); *Y02T 50/672* (2013.01); *Y02T 50/675* (2013.01)

(56) References Cited

U.S. PATENT DOCUMENTS

| | | |
|---|---|---|
| 5,269,135 A | 12/1993 | Vermejan et al. |
| 6,282,881 B1 | 9/2001 | Beutin et al. |
| 2005/0268612 A1* | 12/2005 | Rolt ................................ 60/728 |
| 2008/0095611 A1* | 4/2008 | Storage et al. ................ 415/116 |
| 2008/0314047 A1* | 12/2008 | Anderson et al. ............... 60/806 |
| 2010/0028139 A1 | 2/2010 | Bulin et al. |

\* cited by examiner

FLUID-COOLING DEVICE FOR A TURBINE ENGINE PROPULSIVE UNIT

BACKGROUND OF THE INVENTION

1. Field of the Invention

The present invention relates to the field of aeronautical equipment. It relates more specifically to heat dissipation systems, and even more particularly heat sinks for turbomachine-type aircraft propulsion units.

2. Description of the Related Art

A large number of aircraft propulsion units comprise a turbomachine; this is the case, for example, for propfan-type aircraft propulsion units, where this turbomachine drives two counter-rotating rotors.

In these propulsion units, a gearbox (gears between the turbomachine axle and the rotors) transmits the mechanical energy generated by the turbomachine to the rotors.

Although it has very high efficiency, this gearbox dissipates part of the energy created by the propulsion unit into heat by friction. This heat is transmitted in particular to the gearbox lubricant.

Moreover, the turbomachine itself generates significant heat dissipation mainly by mechanical friction, also through its lubricant.

It is clear that this heat must be dissipated to the outside environment to cool the propfan.

Various solutions have been developed to perform this cooling.

A first solution, close to the state of the art of turbofans (see for example patent application FR2006/0052654), consists of collecting air over a compressor stage (low pressure so that temperatures are not too high), positioning an air/oil exchanger in this air flow, positioning an air regulator valve, and having the air exit tangentially to the outer surface of the nacelle to recover a portion of the thrust. On thermal design points (ground on a hot day, for example), the valve is completely open and, despite the fact that the airplane is immobile, the air exchanger is supplied. In flight, to limit the impact on performance, the air valve is partially open in order to adjust the air flow. The major drawbacks of this solution are:
  Significant impact on the engine's performance due to the collection of air (the turbomachine must be sized taking this loss of flow into account)
  Acoustic impact of ejecting air upstream of the propellers and on a discrete position (non-annular)
  Distortion of the nacelle's external aerodynamic flow, which can lead to a reduction in the propellers' efficiency.

BRIEF SUMMARY OF THE INVENTION

The objective of this invention is therefore to propose a turbomachine cooling device that overcomes the aforementioned drawbacks by providing a sufficient level of cooling on the ground and in flight while limiting the aerodynamic impact during flight phases.

A second objective of the invention is to use a reduced volume, the invention having to be used in particular in a propulsion unit nacelle.

To this end, the invention envisages a fluid cooling device for so-called propfan-type aircraft propulsion unit, said propulsion unit comprising a turbomachine that drives in rotation at least one rotor, said turbomachine being supplied with outside air by an air inlet, said turbomachine comprising a compressor with at least two stages, and generating heating of a lubricant during its operation, said fluid cooling device comprising a pressurized air intake, an air vein able to convey the pressurized air to a volumetric/surface cooler, means of conveying the lubricant's heat to the volumetric/surface cooler, said volumetric/surface cooler comprising:
  firstly, a matrix body provided with a plurality of ducts for a cooling agent, said ducts extending along a first so-called inner surface up to a second so-called outer surface of the matrix body, such that the pressurized air serving as a cooling agent can pass through the matrix body,
  and, secondly, a set of fins extending from the outer surface of the matrix body towards the outside of the propulsion unit, and oriented mainly parallel to the direction of airflow when the aircraft is in flight.

In other words, the volumetric/surface cooler operates in two possible modes: firstly, as a volumetric heat exchanger, by offering a very large area of contact with the cooling agent, within the ducts of the matrix body, secondly, as a surface heat exchanger, thanks to the fins.

In this case, preferably, the matrix body is sized so as to be sufficient to perform the desired cooling by itself when the aircraft is at low or zero speed, within preselected environmental conditions, and the fins are sized so as to be sufficient to perform the desired cooling by themselves when the aircraft is in flight, within preselected environmental and speed conditions.

These fins perform two functions.

In effect, with regard to these fins, the cooler works as a surface heat exchanger, unlike its operation by means of its portion comprising a matrix body crossed by a large number of ducts.

Secondly, these fins contribute to protecting the cooler's matrix body against the impacts of objects.

Preferably, the cooler's matrix body forms a portion of the outer skin of the propulsion unit.

In effect, this arrangement removes the need for an air vein on exit from the matrix body, and thereby reduces the device's size. In addition, it is known that the airflow in flight, perpendicular to the ducts of the matrix body, is little disturbed by the outer surface of this matrix body. The loss of load generated is low, in the light of the resulting simplification.

According to an advantageous implementation, the compressed air intake is positioned downstream of the air compressor's $1^{st}$ or $2^{nd}$ stage.

Alternatively, the cooling device comprises an additional air inlet positioned substantially forward of the propulsion unit.

These arrangements allow a source of pressurized air to be supplied at ambient temperature; this air has to absorb the excess heat in the turbomachine's lubricants.

According to various arrangements that may be implemented together:
  the matrix body comprises a plurality of strips delimiting the ducts,
  the ducts of the matrix body are oriented substantially perpendicular to the outer surface of the matrix body.

In order to control the cooling mode, the cooling device comprises means of controlling the flow of compressed air passing through the ducts of the cooler's matrix body.

The goal here is to make it possible to control the cooler between its volumetric heat exchange mode and its surface heat exchange mode.

The invention also envisages an aircraft comprising a device as described.

In a second aspect, the invention envisages a method designed to use a device as described, said method comprising operations, when the aircraft is on the ground, of commanding the passage of a maximum flow of compressed air through the cooler, and, when the aircraft is in flight, of commanding the passage of a reduced or zero flow of air through the ducts of the cooler's matrix body.

BRIEF DESCRIPTION OF THE SEVERAL VIEWS OF THE DRAWINGS

The description that will follow, given solely as an example of an embodiment of the invention, is made with reference to the figures included in an appendix, in which.

DETAILED DESCRIPTION OF THE INVENTION

Figure 1:
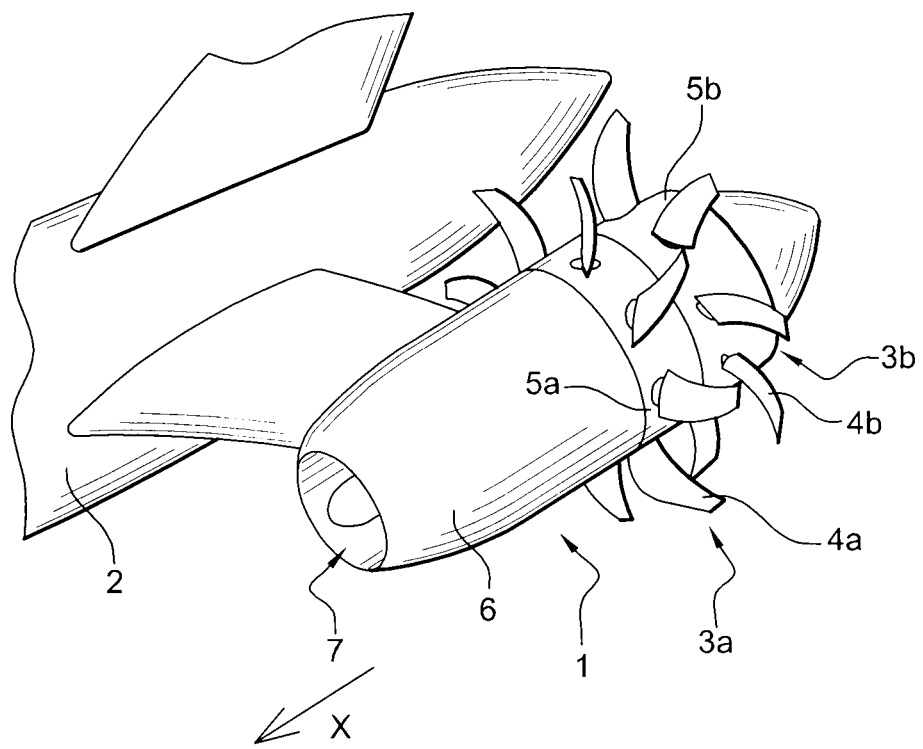
FIG. 1 shows an engine of a type called "propfan," to which the invention can be applied.

The invention is intended to be used in an airplane propulsion unit 1, for example of the type called "propfan", as shown in FIG. 1. Such engines are envisaged for future aircraft. In the example of implementation illustrated here, two propfan propulsion units 1 are attached by engine pylons, on both sides of the rear part of an aircraft fuselage 2.

Each propfan propulsion unit 1 here comprises two counter-rotating rotors 3a, 3b each comprising a set of equidistant blades 4a, 4b and positioned in the rear part of the propulsion unit 1. The blades 4a, 4b of each rotor 3a, 3b protrude from an annular crown 5a, 5b, which is mobile with this rotor, the outer surface of which is located in the continuity of the outer envelope 6 of the propulsion unit.

Figure 2:
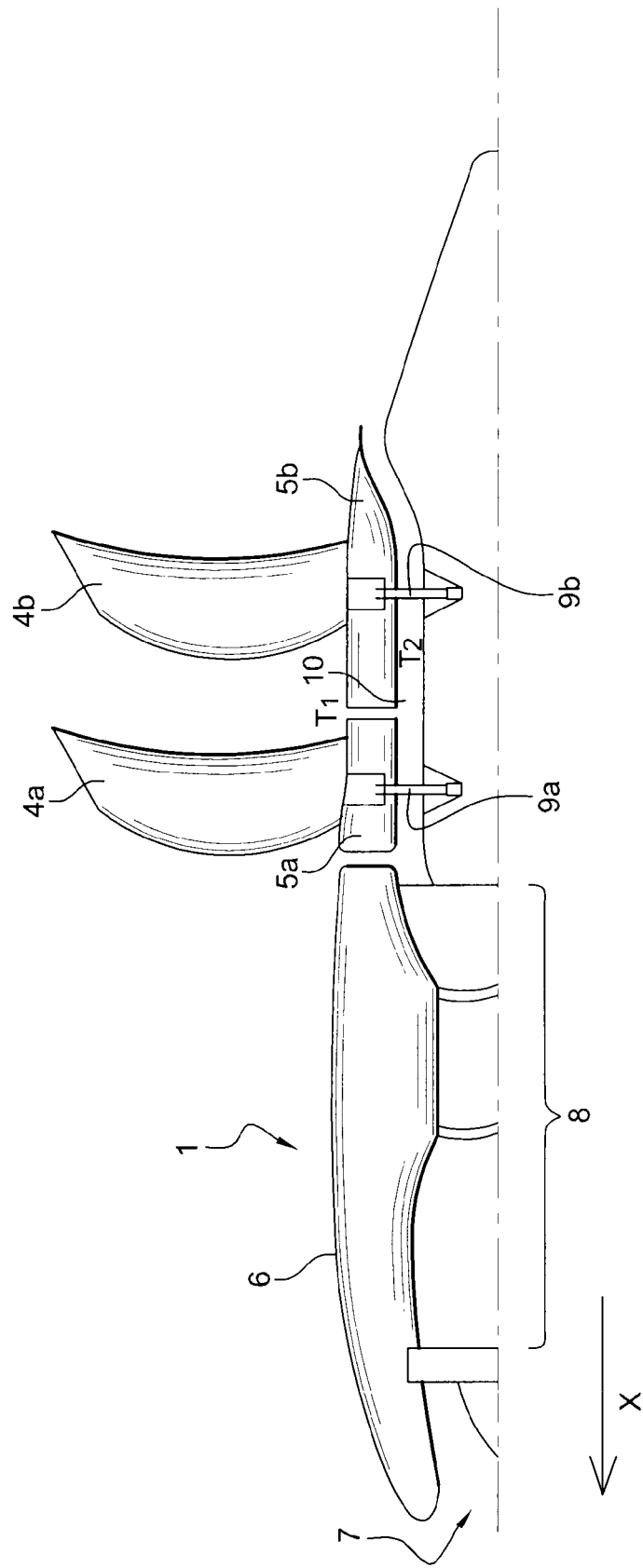
FIG. 2 illustrates such a propulsion unit in a very schematic cross-section view.

As shown schematically in FIG. 2 the propfan propulsion unit 1 comprises an air inlet 7 that supplies a turbomachine 8. This turbomachine 8 comprises an axial portion driven in rotation when the turbomachine is running. In turn, this axle drives the axles 9a, 9b of the blades 4a, 4b of the two counter-rotating rotors 3a, 3b via mechanical transmissions not shown in FIG. 2.

The hot gases generated by the turbomachine 8 when in operation are discharged through a hot annular channel 10 having an outlet located at the rear of the two rotors 3a, 3b. In a variant, these gases can also be discharged upstream of the two rotors.

The realization details of propfans and their components—rotors, turbomachine, transmission, and their dimensions, materials etc.—are outside the framework of this invention. The elements described here are therefore provided only for information purposes, to facilitate understanding of the invention in one of its non-limiting examples of implementation.

During the aircraft's flight, outside air, at a temperature of between +30° C. immediately next to the ground and −50° C. at altitude, circulates along the outer skin of the propulsion unit, substantially in the direction opposite to the longitudinal axis X of movement of the aircraft.

At the same time, the propulsion unit generates a significant heat discharge, part of which is evacuated by the hot annular channel 10 and another part, transferred to the oil circuits of the engine and the gearbox, must be evacuated by an ad-hoc cooling device.

The turbomachine 8 comprises, conventionally, a multi-stage compressor allowing incremental increases in the pressure of air entering the turbomachine.

Figure 3:
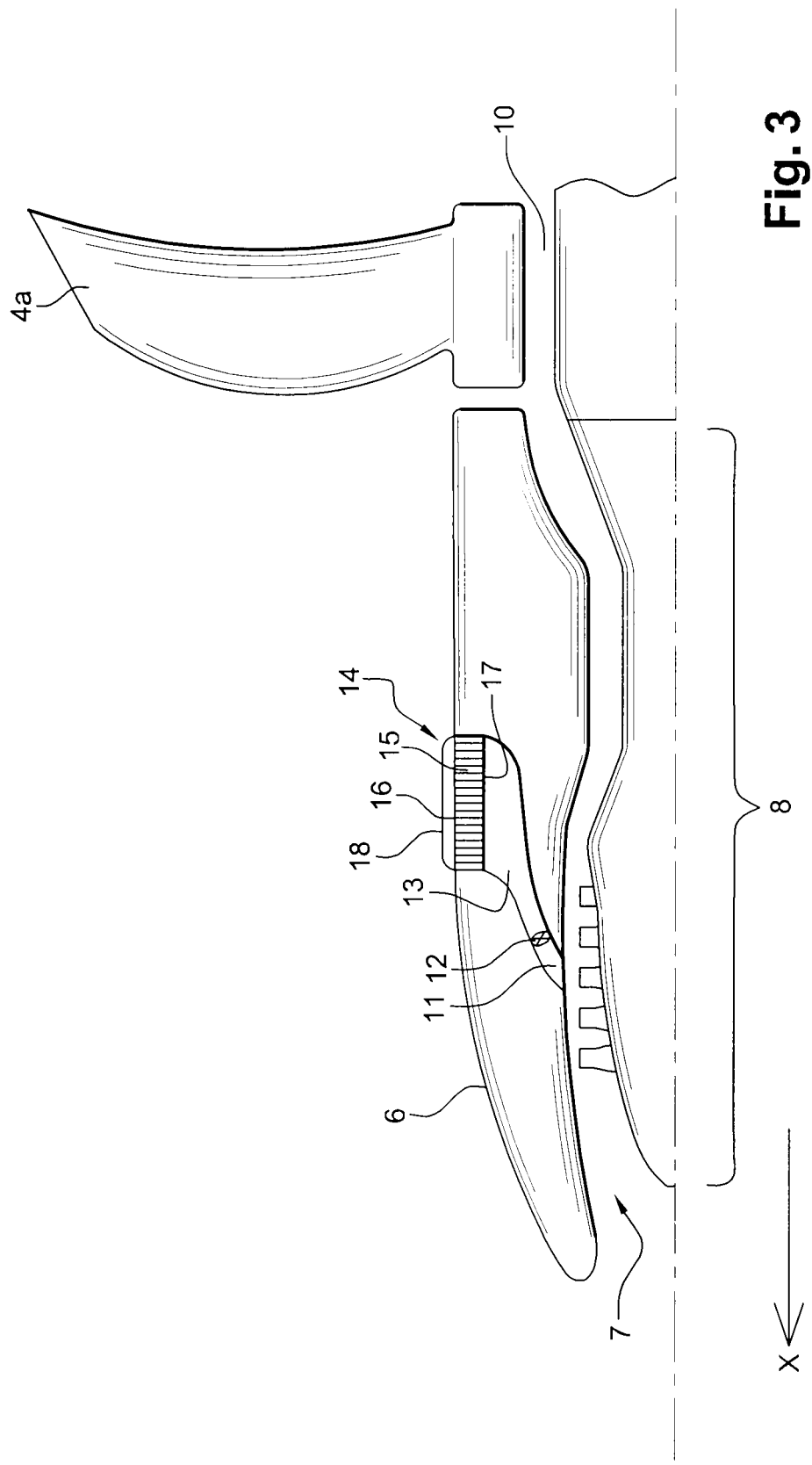
FIG. 3 is a detail view of FIG. 2, centered on the front part of the propulsion unit, which highlights the main elements of the device according to the invention.

The cooling device according to the invention takes advantage of the presence of this compressor, and thus comprises an air intake 11, of a type known per se, positioned, in this non-limiting example, downstream of the second stage of the compressor of the turbomachine 8, as seen in FIG. 3. This arrangement is intended to provide air that is already sufficiently pressurized (1.5 to 2.5 relative bars), but as yet little warmed by compression, unlike the air at the following stages of the compressor.

The position of the collection point naturally depends on the specific characteristics of the turbomachine 8 in question and its compressor, but this position is dictated by the need for air at a sufficient pressure, to bring a predefined airflow to a cooler, and at a sufficiently low temperature, while not disturbing the correct operation of the compressor and more generally of the turbomachine 8.

This air intake 11 comprises a regulator valve 12, here illustrated schematically, designed to control the flow of pressurized air collected at the air intake 11 between a value close to zero and a maximum value determined by the cooling requirement of the gearbox and/or engine oil.

An air vein 13 positioned downstream from the regulator valve 12 conveys the flow of collected pressurized air towards a volumetric/surface cooler 14.

This volumetric/surface cooler 14 is designed to operate in two main heat exchange modes: 1/one on the ground, or during take-off, when the flow of outside air is low or zero and a heat exchange carried out over a very large surface installed in a small volume (by misuse of language, the exchange is said to be volumetric) is preferable, 2/the other in flight, when the flow of outside air is significant and allows heat exchange over a small surface (the exchange is then said to be surface).

This volumetric/surface cooler 14 is for example of the type described in the Airbus Deutschland German patent application no. 10 2009 013 159.0 filed on 16 Mar. 2009, not yet published, and incorporated here in this description by reference.

Figure 4:
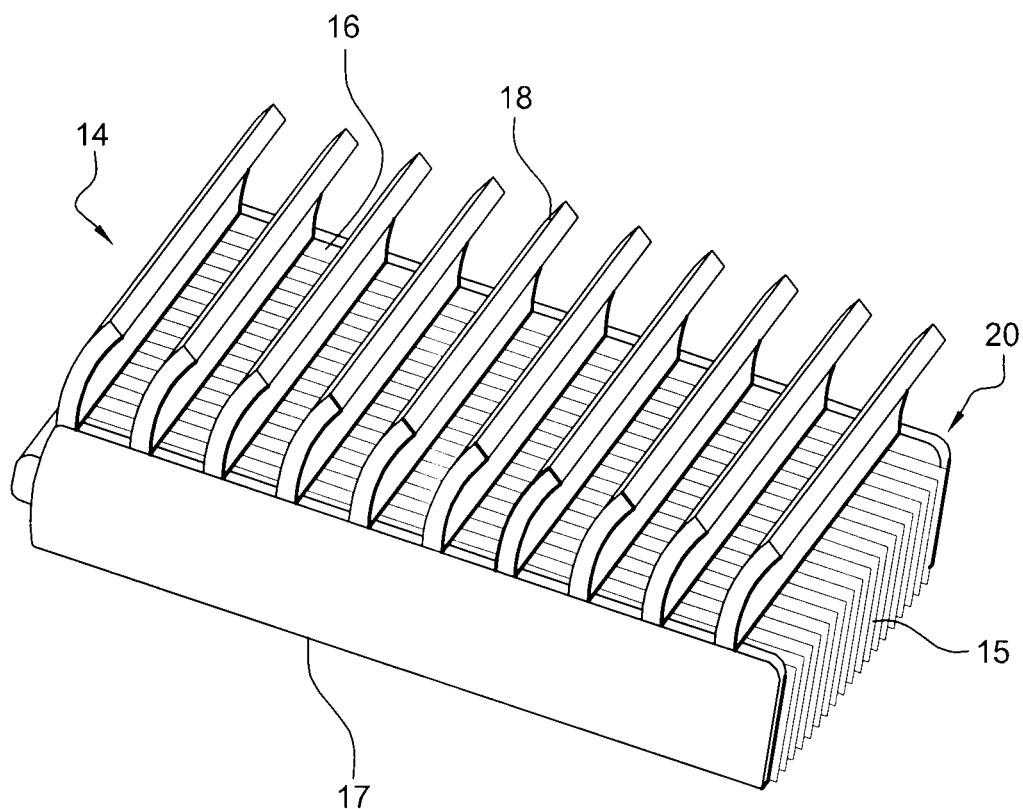
FIG. 4 illustrates a detail view of a volumetric/surface cooler utilized in the invention.

According to this application, summarized here for purposes of clarification, the volumetric/surface cooler 14 comprises (FIG. 4), firstly, a matrix body 15, in which a set of ducts 20 have been installed for the passage of the cooling agent, here the pressurized air brought by the air valve 13.

This matrix body 15 is composed, for example, of assembled strips, which thus delimit the ducts 20 for the passage of pressurized air.

The matrix body 15 is made of a material with high heat conductivity, e.g. a metal alloy or composite material suitable for this purpose.

The matrix body 15 serves as a heat transfer between the fluid to be cooled (the gearbox lubrication oil in this case) and the pressurized air at a temperature close to ambient temperature. In this non-limiting example, the matrix body 15 comprises a set of tubes (not shown in the figures) embedded in its volume and in which the fluid to be cooled circulates.

In the case where cooling several fluids simultaneously is wished, various networks of tubes are installed in the volume of the matrix body 15.

The matrix body 15 is positioned, in this example, so that its outer surface 16 extends the outer surface 6 of the propulsion unit nacelle, locally replacing this outer surface 6. The matrix body 15 of the cooler thus forms a portion of the outer skin of the propulsion unit. The shape of the body matrix is therefore here generally cylindrical, and in all cases determined by the shape of the outer surface of the propulsion unit nacelle at the place where the matrix body must be installed. The matrix body 15 here has a substantially rectangular shape, arched to match the profile of the surface 6 of the propulsion unit nacelle.

The inner surface 17 of the matrix body is, in this example, substantially parallel to its outer surface 16, the length of the ducts 20 being thus quasi-constant, and equal in this example to the distance between these inner 17 and outer 16 surfaces, if the ducts 20 are perpendicular to these surfaces.

The dimensions of the matrix body 15 are determined by the cooling requirement when the airplane is on the ground or at low speeds, the flow of pressurized cold air available and the exchange surface installed within the matrix body 15. The calculation is known to experts and is therefore not detailed further here. For cooling during take-off an electrical generator equipping an aircraft having about 150 seats and two propulsion groups, the front surface of the heat exchanger is approximately 80 in$^2$ for an approximate thickness of 3 in. The maximum airflow passing through the heat exchanger is approximately 0.45 kg/s. The volumetric/surface cooler 14 comprises secondly a set of fins 18 starting from the outer surface 16 of the matrix body 15 and protruding at the outer surface 16 of the matrix body.

These fins 18 act as surfaces guiding the airflow, and are oriented substantially parallel to the flow lines of an air stream flowing over the outer surface 16 of the matrix body 15 when the aircraft is in flight, i.e. substantially along the longitudinal axis X.

The fins 18 are realized here in the same material as the matrix body 15, to the surface of which they are fastened by the greater part of their lower edge.

The dimensions of these fins 18 are determined by the cooling requirement when the airplane is in flight, and by the flow of outside air and the temperature of the air flowing along the surface of these fins 18. The details of such a calculation are known to experts. For cooling during cruising an electrical generator equipping an aircraft having about 150 seats and two propulsion groups, the exchange surface of the fins is approximately 0.5 m$^2$ for fins approximately 50 mm high.

In addition, these fins 18, in this example, have a profile curved in the direction of the outer surface 16 of the matrix body 15. The fins 18 protect the matrix body 15 and in particular the outer surface 16 of the matrix body 15 from external impacts, e.g. bird-strikes, hail, etc.

Figure 5:
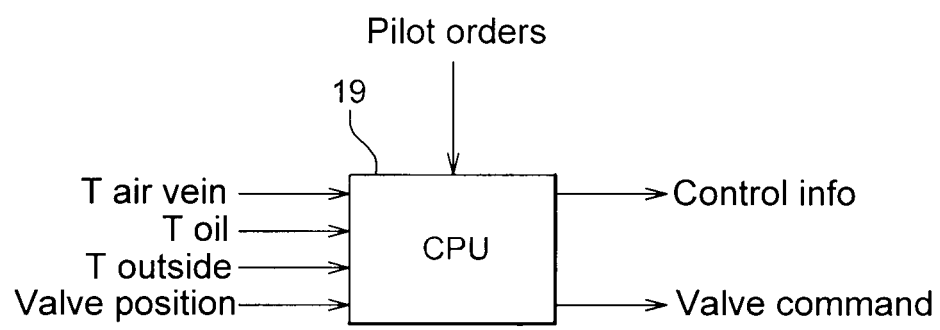
FIG. 5 illustrates schematically the data processed by the electronic control unit of the cooling device according to the invention.

The cooling device is controlled by an electronic control unit 19, (shown in FIG. 5), of a type known per se, whose primary function is setting the regulator valve 12 according to various input information.

In this non-limiting example, as inputs this electronic control unit 19 receives temperature data for the oil circuits that the cooling device must regulate, as well as for the outside air and the air in the air vein 13. It also receives status information concerning the regulator valve 12.

It transmits control data, e.g. temperature of the oil circuits and position of the regulator valve, to the aircraft's cockpit, from which it also receives instructions.

This electronic control unit 19 may be installed at the propulsion unit, in the immediate vicinity of the volumetric/surface cooler 14. Alternatively, the electronic control unit 19 may be part of the various pieces of electronic equipment located in the cockpit, or simply be one of the functions provided by one of the multi-purpose computers usually found in aircraft.

Figure 6:
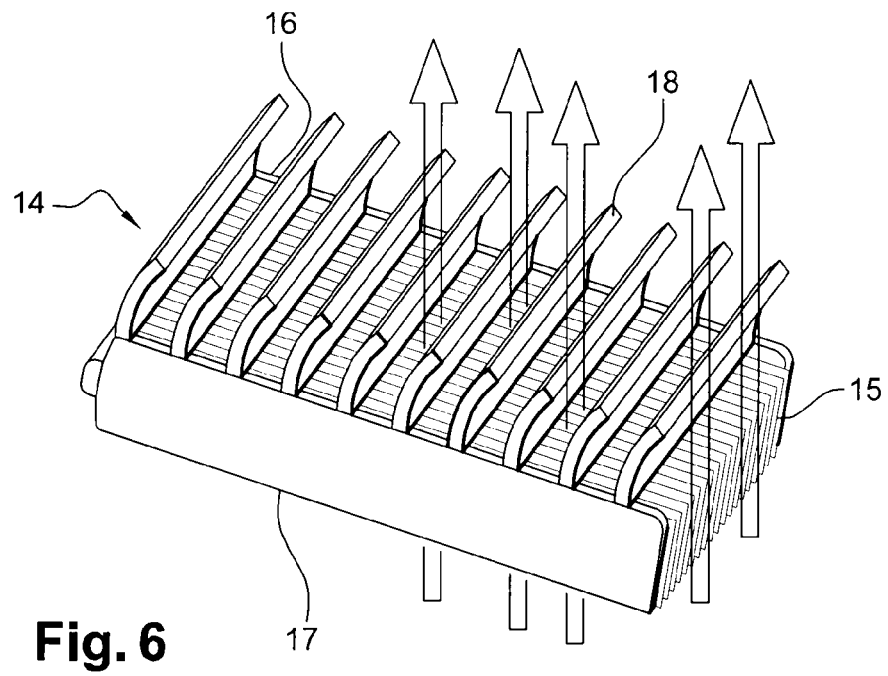
FIG. 6 illustrates the operation of the cooling device according to the invention when the aircraft is on the ground, FIG. 7 then illustrates in a detailed view the air circulation in the cooler in this mode of operation, FIG. 8 likewise illustrates the operation of the cooling device according to the invention when the aircraft is in flight, FIG. 9 then illustrates in a detailed view the air circulation in the cooler in this mode of operation.
Figure 7:
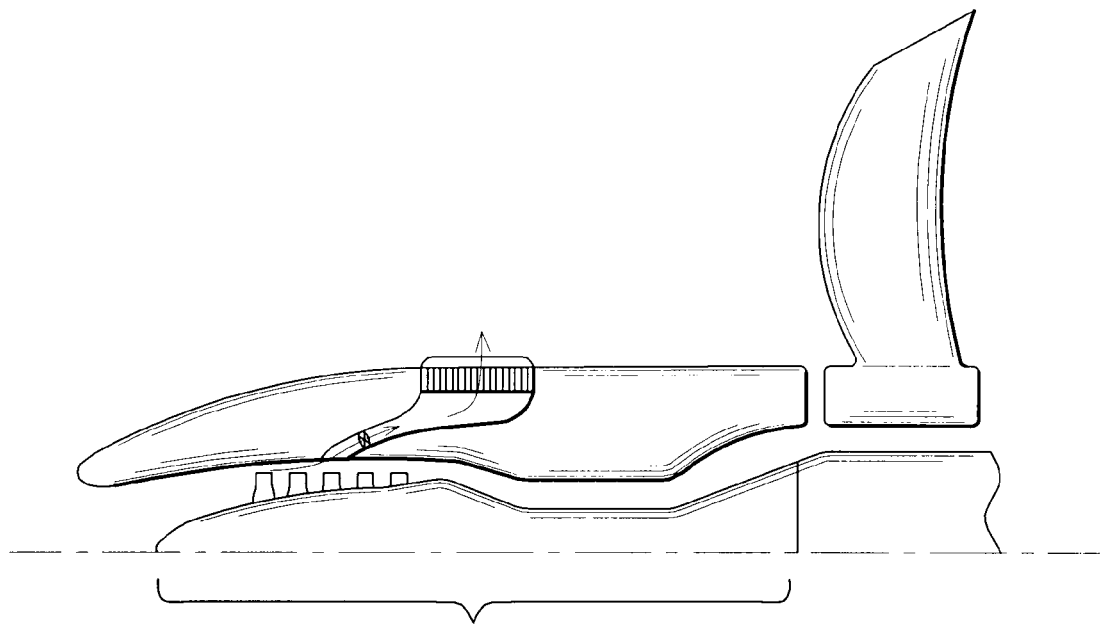

In operation, when the aircraft is on the ground (FIGS. 6 and 7) or in taxiing, takeoff or approach phases, with the propulsion units operating, the thermal discharge from the propulsion group is very large and the airplane's speed is low or zero.

During these phases, the flow of outside air is low and not sufficient for cooling only by the fins 18. The electronic control unit 19 therefore sets the regulator valve 12 substantially into the maximum open position, allowing the matrix body 15 to be traversed by the pressurized air collected at the compressor. This ensures a heat exchange between the hot matrix body 15 and the cold pressurized air, causing the desired cooling of the matrix body 15 and the fluids circulating inside or connected to it by thermal conduction.

As the climb progresses and evolves towards level flight, the speed of the aircraft increases and the outside air temperature decreases. Accordingly, the collection of air at the compressor is reduced by gradual closing of the regulator valve 12 controlled by the electronic control unit 19, and the cooling is increasingly performed only by the fins 18.

Figure 8:
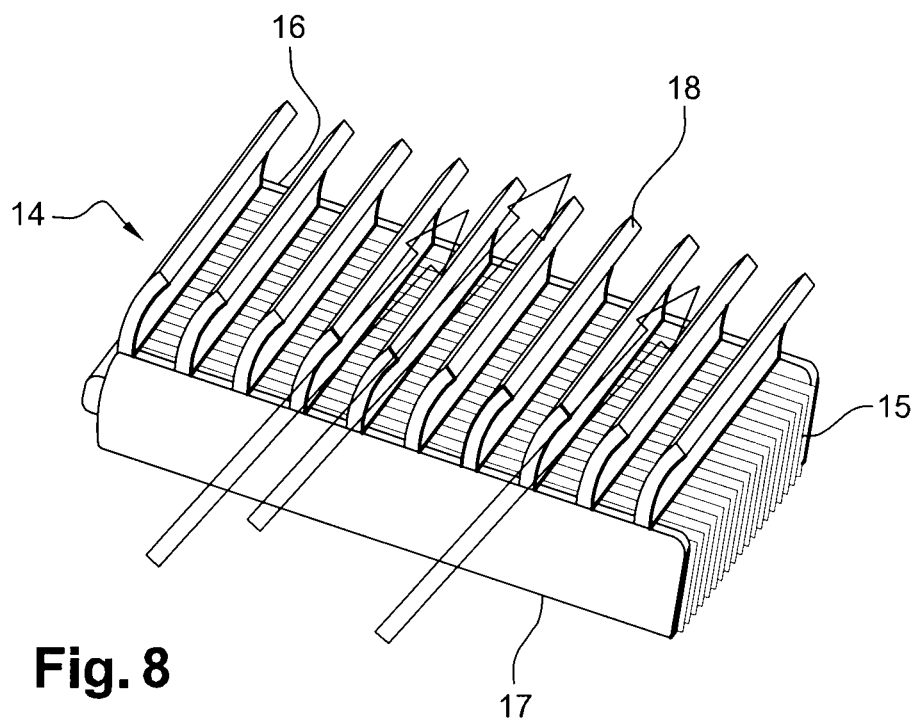
Figure 9:
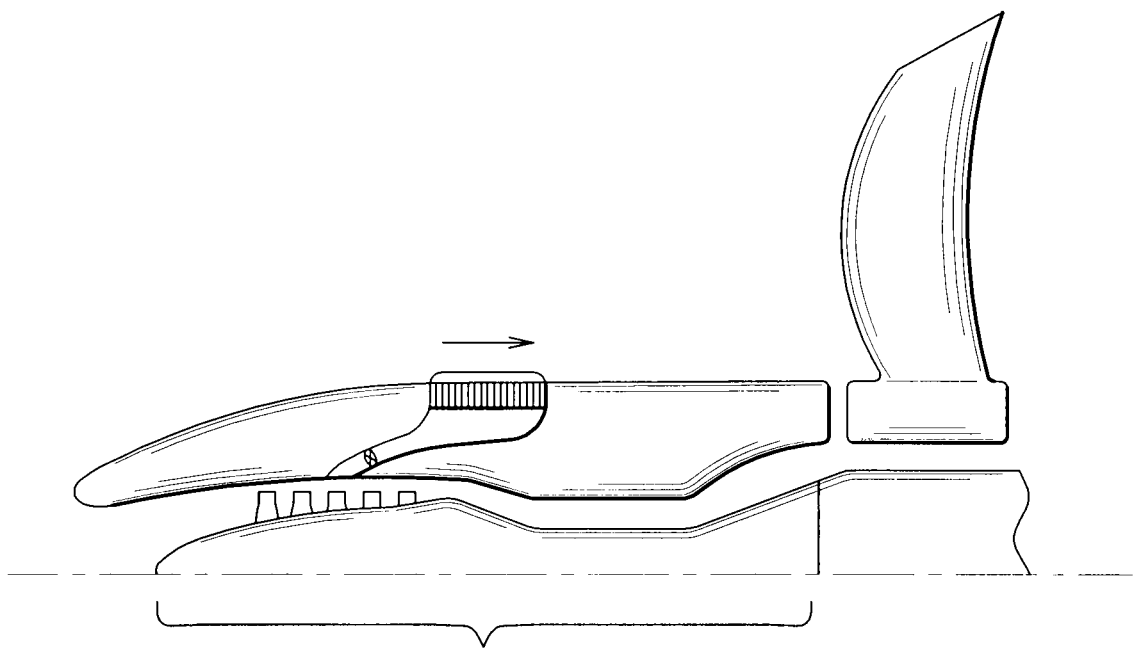

Subsequently, when the aircraft is in steady flight (FIGS. 8 and 9), the cooling is performed normally by the external fins 18, and the regulator valve thus remains closed, thereby eliminating the collection of air from the compressor, and therefore reducing the increased fuel consumption that otherwise arises from this power draw Of course, in the event of special conditions (high outside temperatures, overload of the electrical generators, etc.), even in this flight phase it is possible, on the basis of oil temperature information received, to order via the electronic control unit 19 the opening of the control valve 12, so as to circulate air in the matrix body and thereby increase the overall cooling capacity of the cooling device.

It is apparent from the description that the cooling device allows the engine components to be cooled in all flight phases while allowing the surface exchanger to be used during cruising phases. The engine's aerodynamic performance is thus improved.

The fact of managing the opening of the regulator valve 12 during the flight allows the power draw on the compressor to be controlled, and to be reduced whenever possible, which translates into reduced consumption.

In addition, the present invention takes advantage of the presence of the compressor, which allows pressurized air to be supplied, without having to add a specific fan dedicated to making air pass through the matrix body. This results in increased simplicity for the device, as well as smaller dimensions and also lower fuel consumption.

The scope of this invention is not limited to the details of the forms of embodiment considered above as an example, but on the contrary extends to modifications in the reach of the expert.

In a variant, it is possible to replace, or supplement, the air collection point 11 by a second air inlet, positioned forward of the propulsion unit nacelle, close to the main air inlet 7. This second air inlet is also equipped with a regulator valve 12'.

If the air collection point 11 is replaced by the second air inlet, a fan is integrated within the new air vein 13' to provide a sufficient flow of cooling air when the aircraft is on the ground.

In contrast, if the second air inlet co-exists with the air collection point 11 on the compressor, this second air inlet is particularly usable when the speed of the aircraft is sufficient to provide a significant flow of cooling air, for example above Mach 0.2. With the aim of further reducing the power draw on the compressor, it is possible to combine the two sources based on the flight modes, modifying the electronic control unit 19 accordingly.

In another embodiment, the matrix body 15 comprises ducts 20 that are no longer perpendicular to its outer surface 16, but on the contrary are slanted toward the rear of the propulsion unit, so as to reduce the drag caused by the matrix body 15.

A matrix body 15 with a rectangular, arched shape has been mentioned in the description. Of course, other geometries are possible, in particular for taking into account availability in terms of volume in the vicinity of the outer surface 6 of the propulsion unit nacelle. One arrangement that can be envisaged comprises several matrix bodies 15 distributed at regular angular intervals around the nacelle, so as to limit the disturbance on the blades created by the airflow created at the exit from said matrix body 15.

In another variant, not shown, the matrix body 15 is not flush with the outer surface 6 of the propulsion unit nacelle, but is positioned a few centimeters under this surface, and only its fins 18 pass the outer surface 6. In this case, the ducts 20 are slanted and an air outlet vein conveys the air leaving the matrix body 15 to an air outlet point at the outer surface 6 of the nacelle.

The invention claimed is:

1. A fluid cooling device for a propulsion unit of a propfan type aircraft, said propulsion unit comprising a turbomachine that drives in rotation at least one rotor comprising a plurality of fan blades, said turbomachine being supplied with outside air by an air inlet, said turbomachine comprising a compressor, disposed upstream of the rotor and the fan blades, with at least two stages, and generating heating of a lubricant during operation thereof, the fluid cooling device comprising:
    a pressurized air intake;
    a volumetric/surface cooler which cools the lubricant;
    an air vein which conveys pressurized air to the cooler;
    a regulator valve which regulates a flow of pressurized air into the air vein; and
    a controller configured to control the regulator valve, wherein the cooler includes
        a matrix body provided with a plurality of ducts for a cooling agent, said ducts extending along a first inner surface of the matrix body up to a second outer surface of the matrix body, and
        a set of fins extending from the outer surface of the matrix body towards an outside of the propulsion unit, and oriented mainly parallel to a direction of airflow when the aircraft is in flight,
    wherein the cooler is disposed downstream of the air inlet, and disposed upstream of the fan blades such that the set of fins is disposed upstream of the fan blades, and
    wherein the controller is configured to set the regulator valve in an open position when a speed of the aircraft is below a first predetermined value such that the pressurized air flowing into the air vein passes through the ducts of the matrix body, and the controller is configured to set the regulator valve in a closed position when the speed of the aircraft is above a second predetermined value and an outside temperature is below a predetermined temperature.

2. The cooling device according to claim 1, wherein:
    the matrix body is sized so as to be sufficient to perform a desired cooling by itself when the aircraft is at low or zero speed, within preselected environmental conditions, and
    the fins are sized so as to be sufficient to perform the desired cooling by themselves when the aircraft is in flight, within preselected environmental and speed conditions.

3. The cooling device according to claim 1, wherein the matrix body of the cooler forms a portion of an outer skin of the propulsion unit.

4. The cooling device according to claim 1, wherein the pressurized air intake is positioned downstream a first or second stage of the compressor of the turbomachine.

5. The cooling device according to claim 1, wherein the matrix body comprises a plurality of strips delimiting the ducts.

6. The cooling device according to claim 1, wherein the ducts of the matrix body are oriented substantially perpendicular to the outer surface of the matrix body.

7. The cooling device according to claim 1, wherein the propulsion unit includes two counter-rotating rotors each including a set of fan blades.

8. The cooling device according to claim 3, wherein the outer surface of the matrix body matches a profile of the outer skin of the propulsion unit.

9. An aircraft comprising a cooling device according to claim 1.

10. A method for operating the device according to claim 1, comprising:
    opening the regulator valve when the aircraft is on the ground so as to maximize the flow of pressurized air through the cooler; and
    closing the regulator valve when the aircraft is in flight so as to minimize the flow of compressed air through the ducts of the matrix body of the cooler.

* * * * *